Jan. 9, 1940.                E. G. STAUDE                2,186,395
                       VARIABLE SPEED GEARING
                        Filed Nov. 2, 1936         14 Sheets-Sheet 7
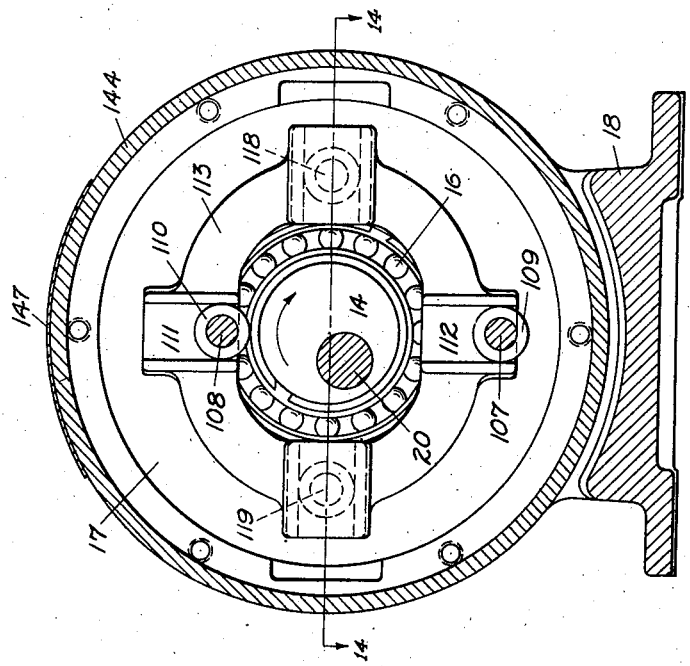
*Fig 10*
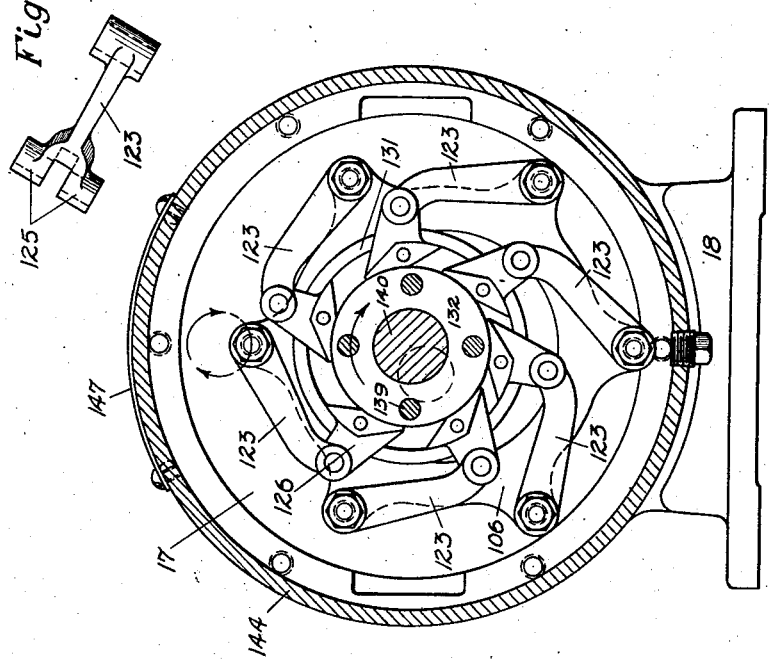
*Fig 19*  *Fig 9*
INVENTOR
EDWIN G STAUDE
By
   ATTORNEYS Jan. 9, 1940.　　　　E. G. STAUDE　　　　2,186,395
VARIABLE SPEED GEARING
Filed Nov. 2, 1936　　14 Sheets-Sheet 8

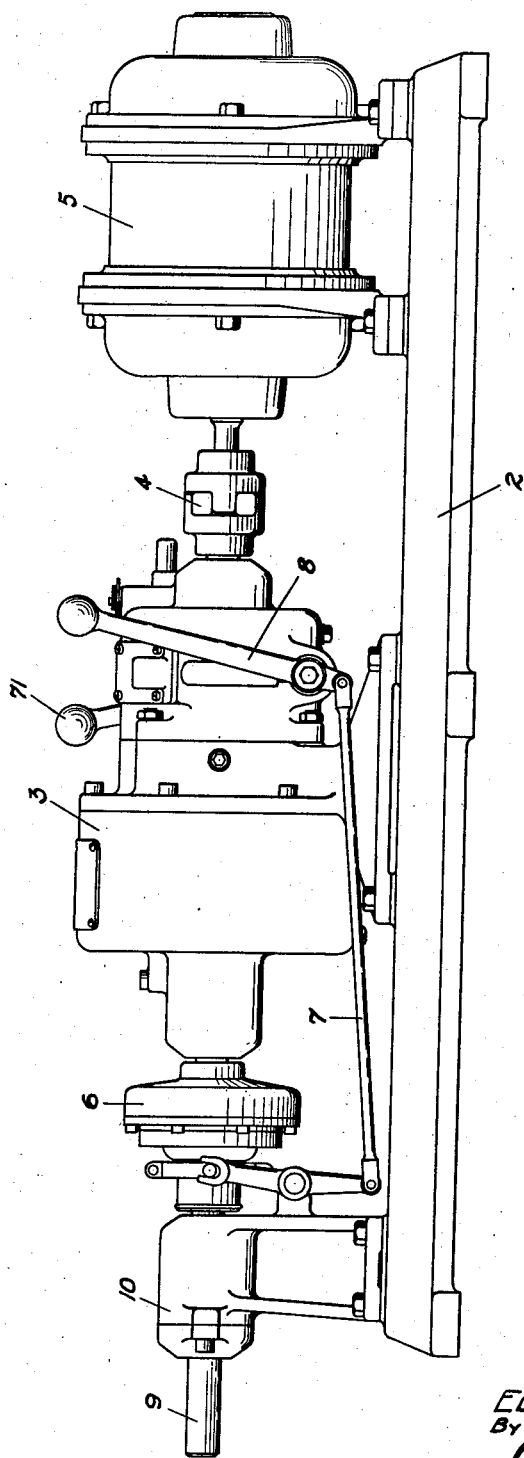

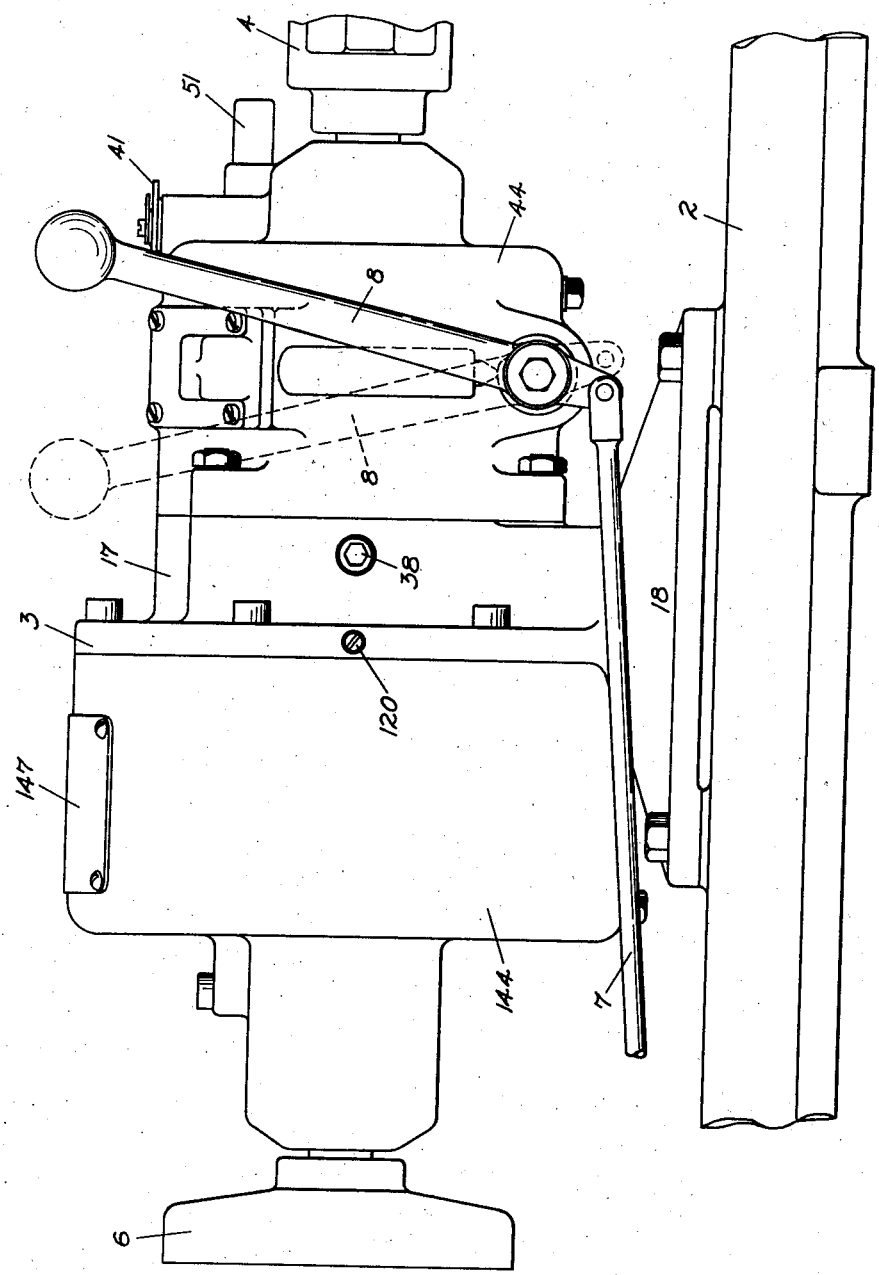

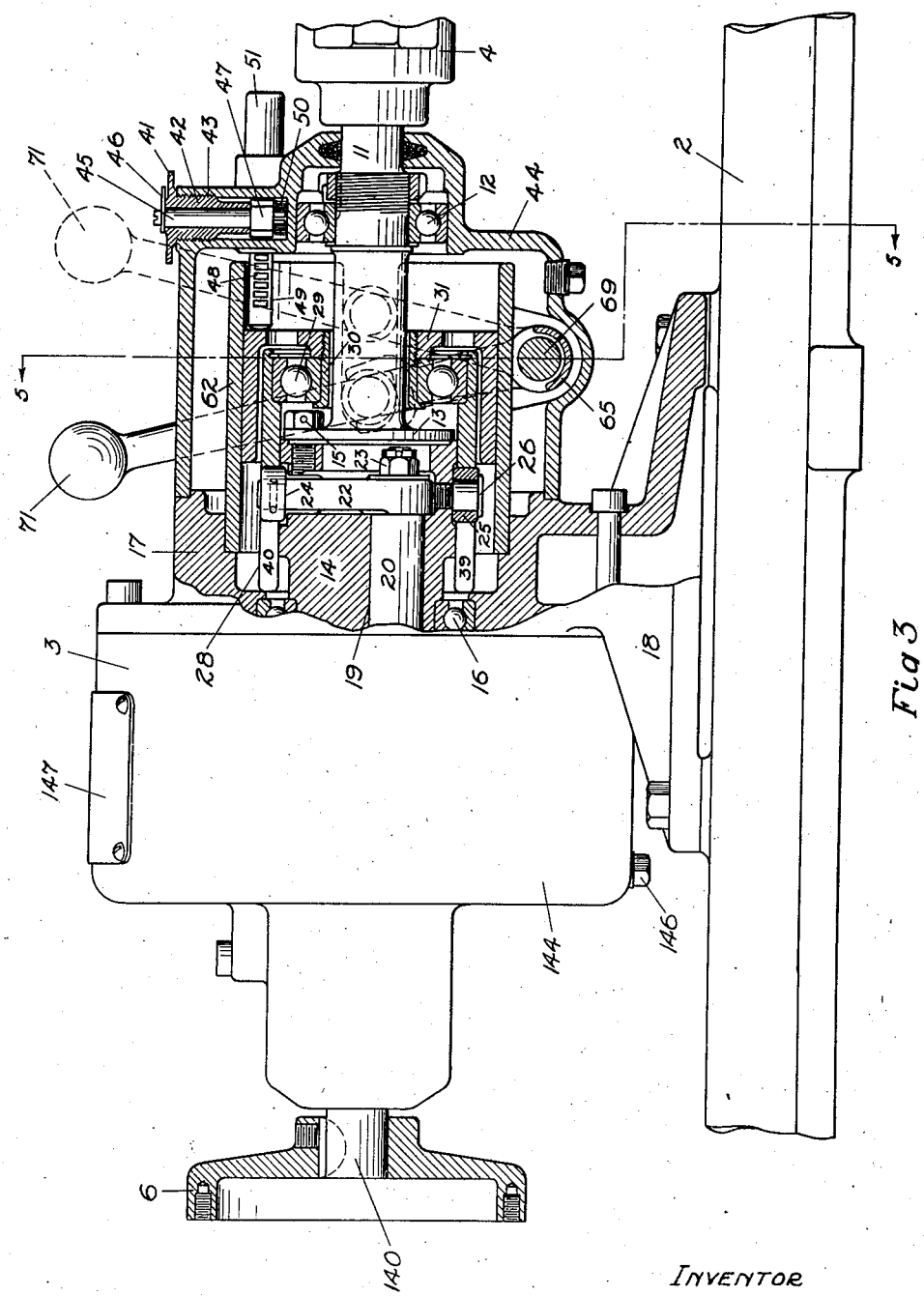

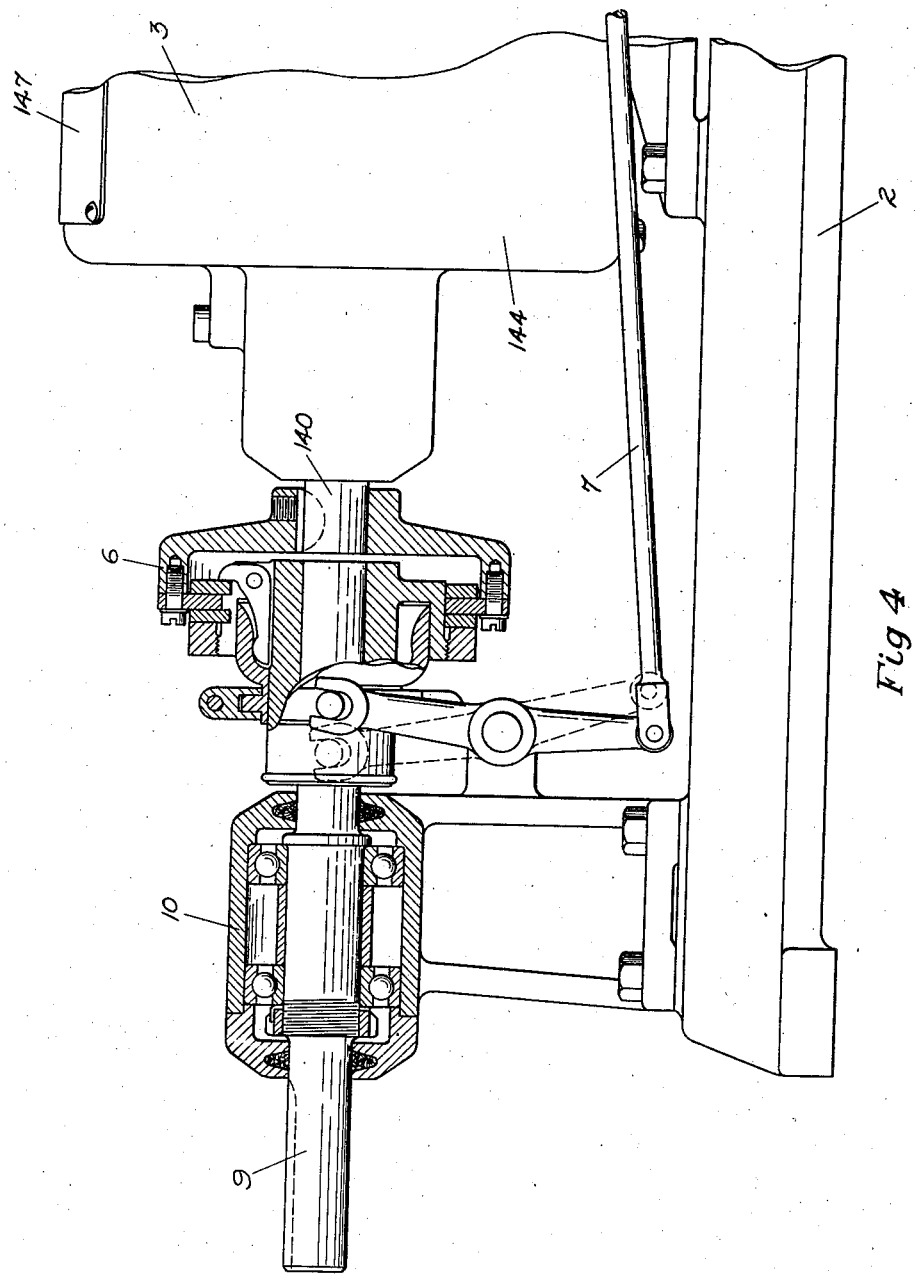

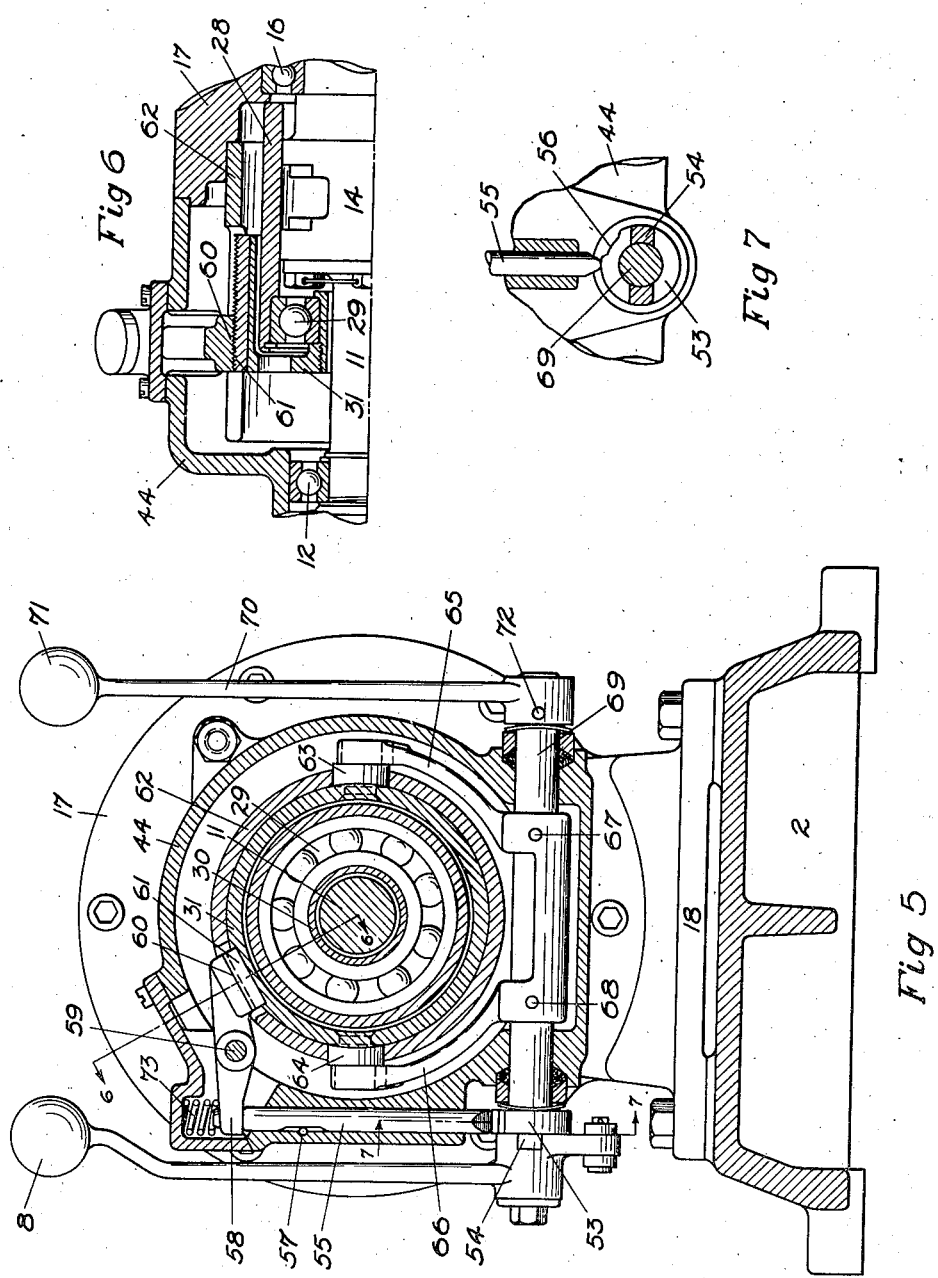

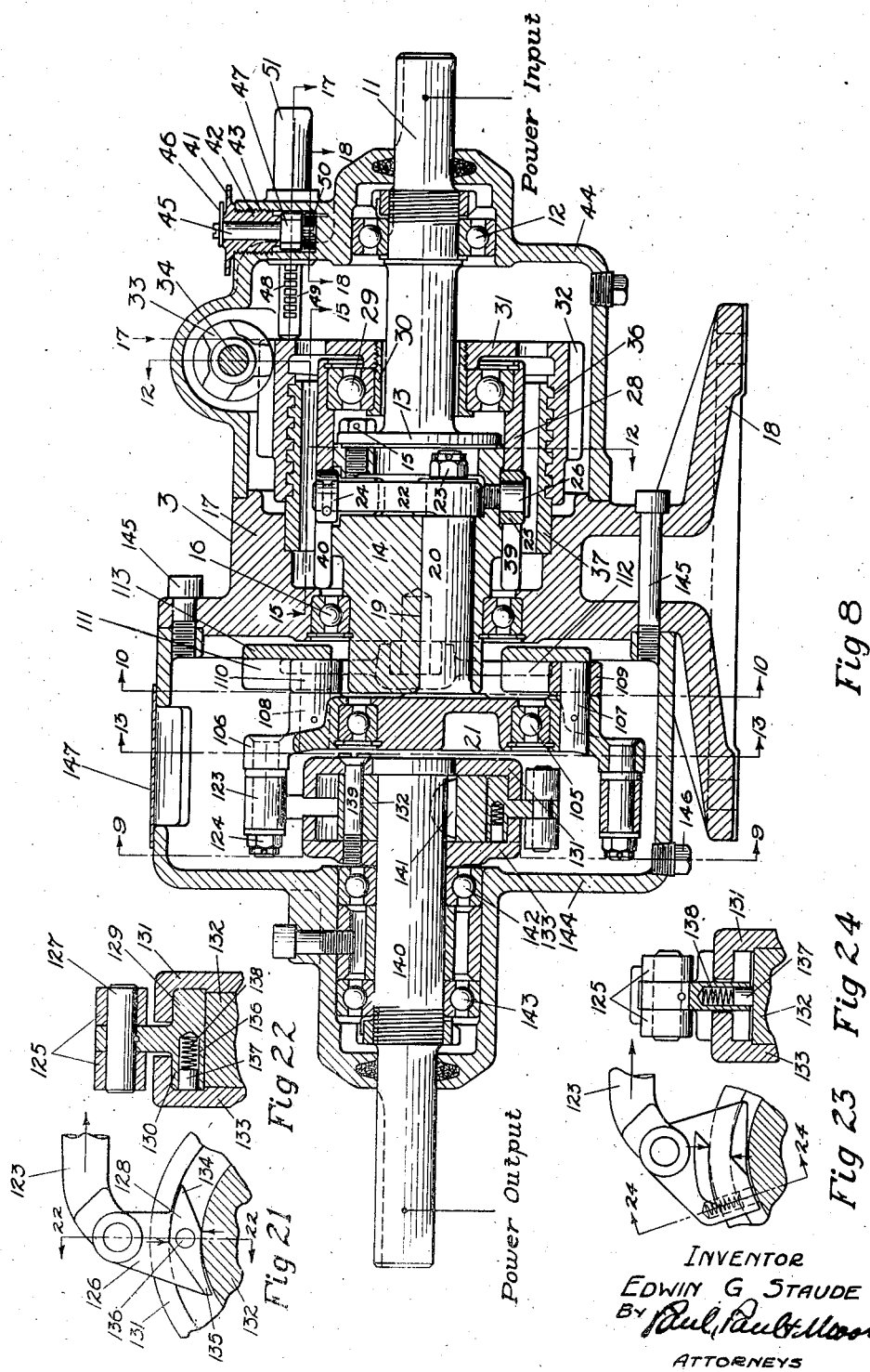

INVENTOR
EDWIN G. STAUDE
BY
ATTORNEYS

Jan. 9, 1940.    E. G. STAUDE    2,186,395
VARIABLE SPEED GEARING
Filed Nov. 2, 1936    14 Sheets-Sheet 9
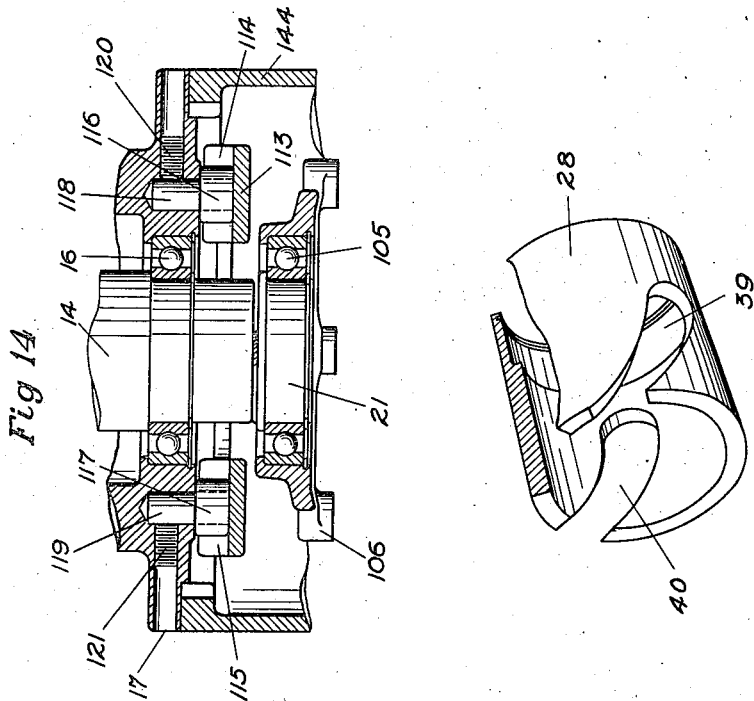
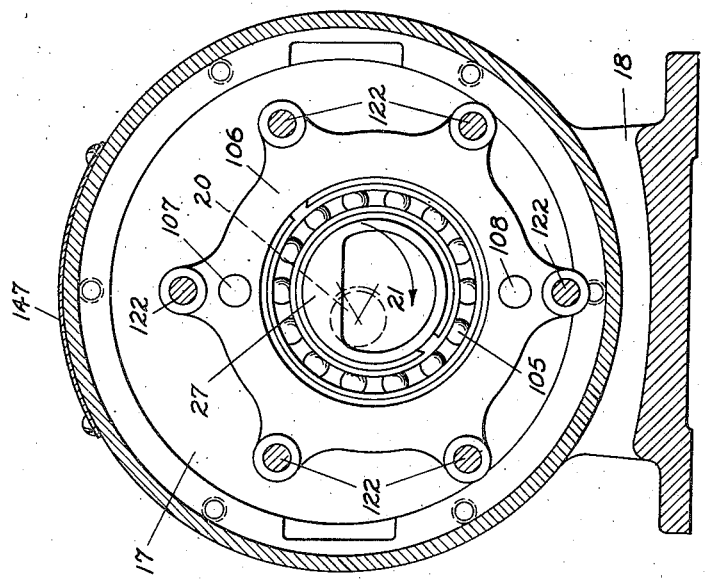
INVENTOR
EDWIN G STAUDE
BY
ATTORNEYS Jan. 9, 1940.  E. G. STAUDE  2,186,395
VARIABLE SPEED GEARING
Filed Nov. 2, 1936  14 Sheets-Sheet 10
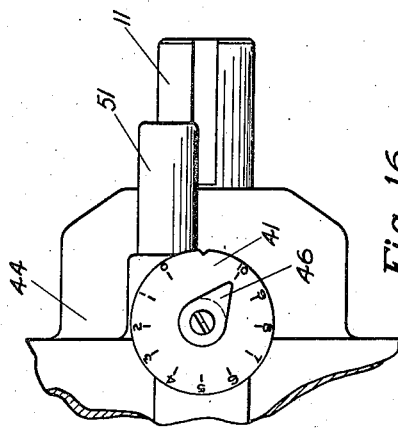
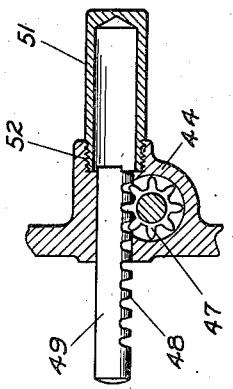
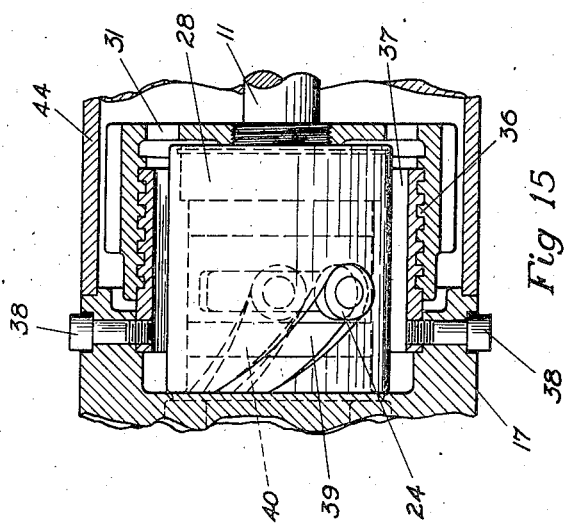
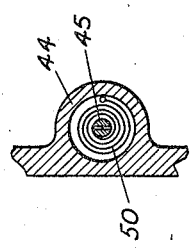
INVENTOR
EDWIN G STAUDE
BY
ATTORNEYS

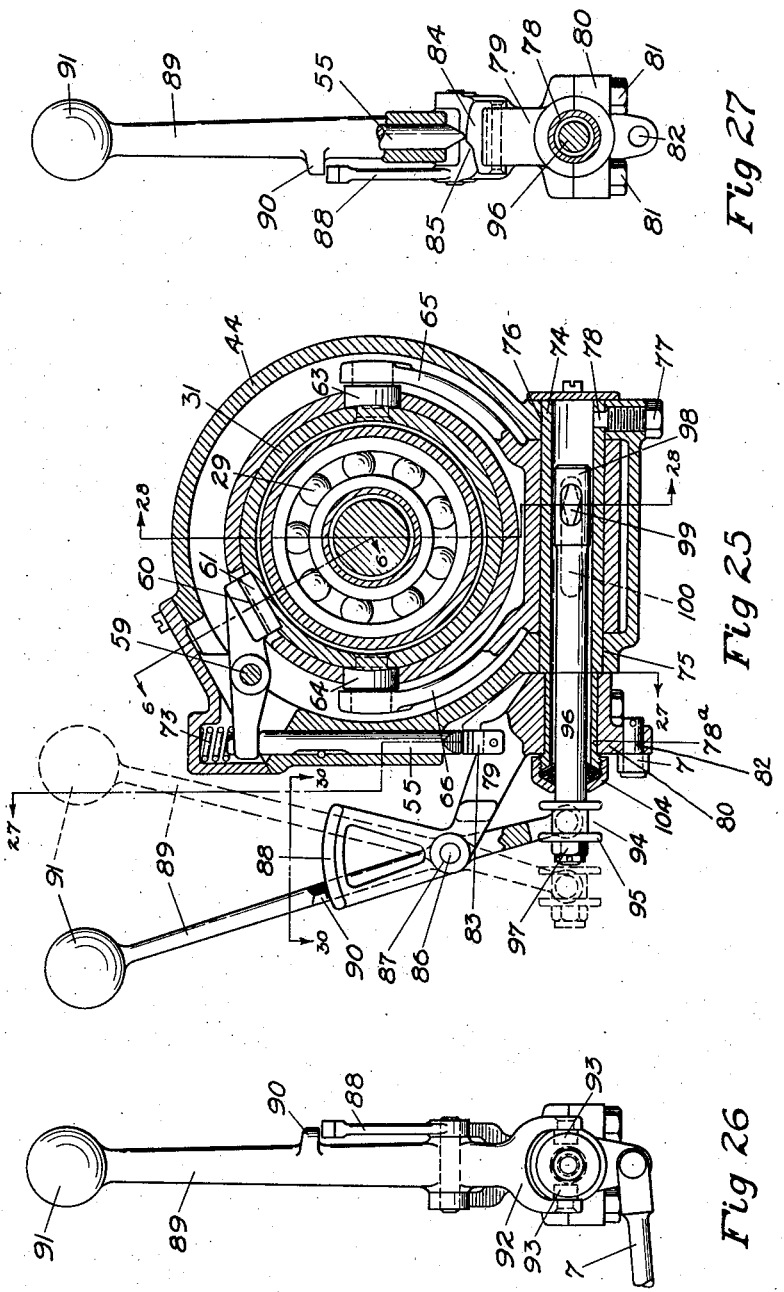

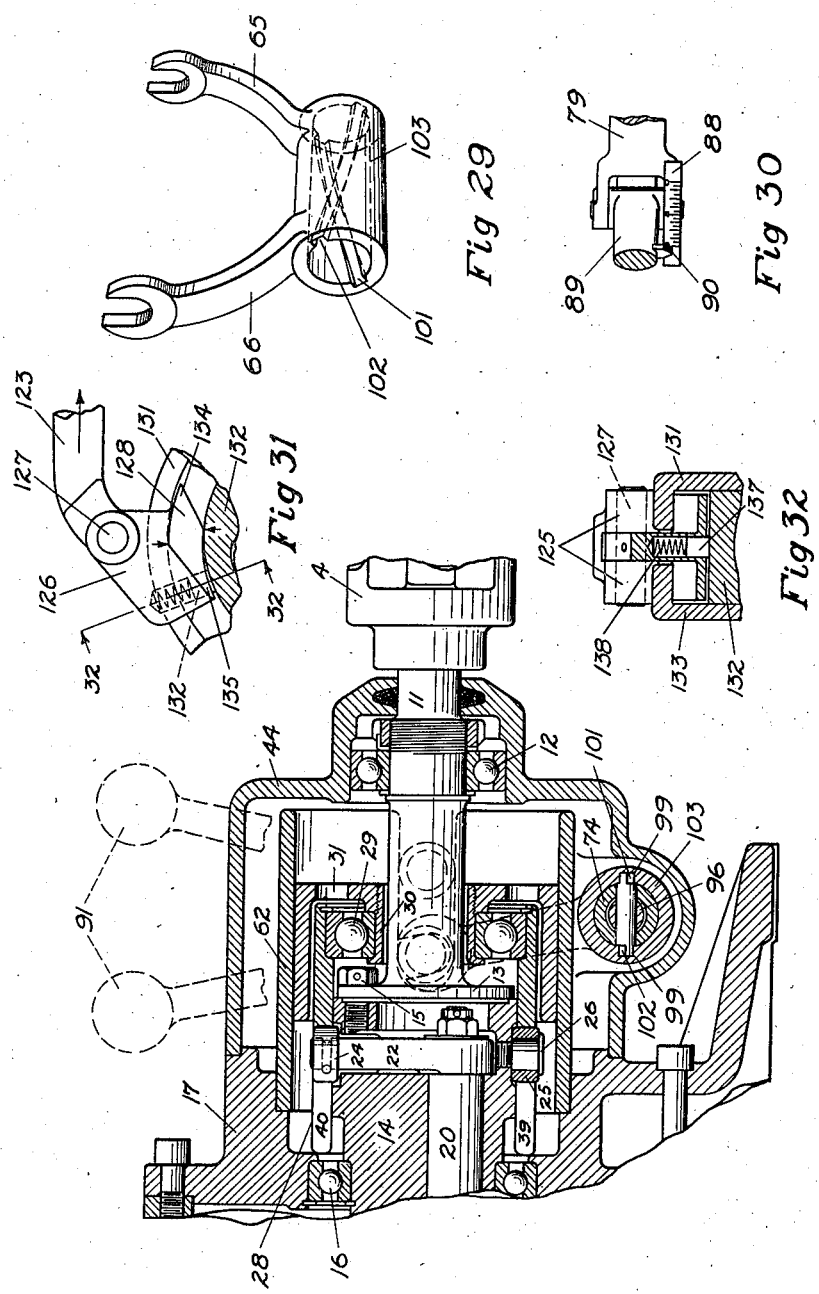

Jan. 9, 1940.   E. G. STAUDE   2,186,395
VARIABLE SPEED GEARING
Filed Nov. 2, 1936   14 Sheets-Sheet 13
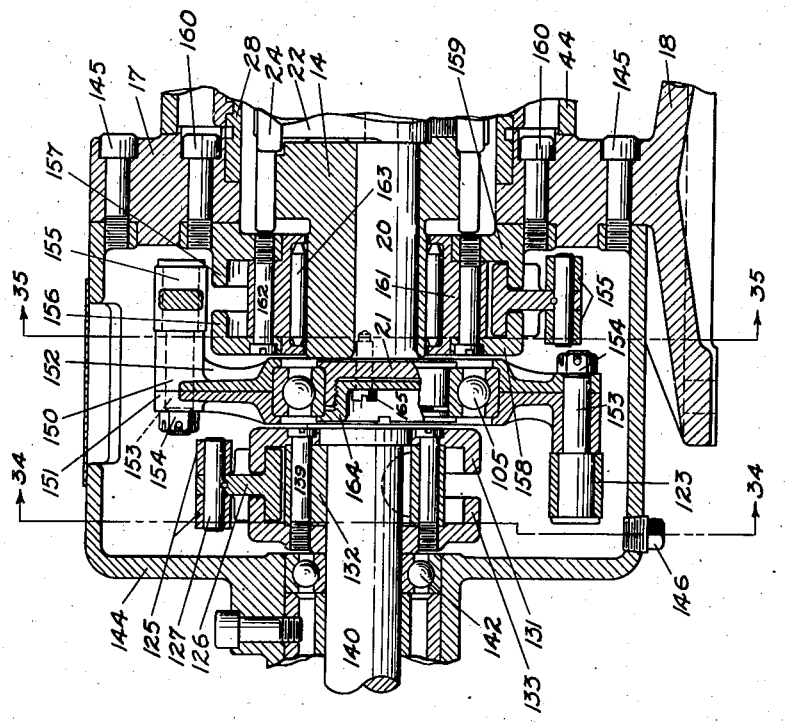

Jan. 9, 1940.  E. G. STAUDE  2,186,395
VARIABLE SPEED GEARING
Filed Nov. 2, 1936   14 Sheets-Sheet 14

INVENTOR
EDWIN G STAUDE
BY
ATTORNEYS

Patented Jan. 9, 1940

2,186,395

UNITED STATES PATENT OFFICE 2,186,395

VARIABLE SPEED GEARING

Edwin G. Staude, Minneapolis, Minn.

Application November 2, 1936, Serial No. 108,709

16 Claims. (Cl. 74—117)

The primary object of my invention is to provide a practical, speed change mechanism adapted to be directly coupled to an electric motor or other power source and be capable of speed variation adjustment from zero upwardly, and also be capable of such adjustment either while in motion or not in motion. In some respects this invention is an improvement over the structure shown in my prior Patent 1,197,309, but some of the features herein are believed broadly new in themselves.

A further object is to provide an improved controlling mechanism in which speed adjustment can be made either by hand or by other means, and while under load, or idling, or motionless. A further object is to provide a counter-balance device for an oscillating mechanism, which shall perform its balancing function at practically top speeds and out of balance only at bottom or low speeds.

A further object is to provide a compact, positive, reciprocable gripping or clutch mechanism which will operate in an oil bath without slippage and which will operate with generation of a minimum amount of heat. A further object is to provide a simplified control means which first acts to disengage a clutch connected to an output member, and secondly acts to adjust the speed while the load is disconnected, using either a single lever for controlling both operations or a separate lever for each. A further object is to provide a strong speed changing mechanism, for changing the speed while in motion and without removing the load.

Other objects are: to provide a novel speed indicator for registering the approximate number of revolutions of the power output; to provide a simplified construction, and method of assembling parts, which require heat treating, hardening or grinding; and to provide a compact, fully enclosed variable speed power transmission unit, simple in design and efficient in performance.

Features of the invention include all details of construction along with the broader ideas of means inherent in the disclosure.

Other objects, features and advantages will appear in the description of the drawings forming a part of this application and in said drawings:

Figure 1 is an elevation of my improved variable speed transmission, showing a motor directly coupled to the power input side of the transmission, and showing a clutch directly coupled to the power output, the clutch being controlled by a lever which is adapted to unlock the transmission speed shifting member after the clutch is disengaged, and also showing a separate speed-shift lever;

Figure 2 is an enlarged side view of the speed transmission;

Figure 3 is an elevation of the variable speed power transmission, partly in longitudinal section;

Figure 4 is a longitudinal section of a conventional type of clutch, keyed to the power output shaft of my transmission, for disengaging the driven member when required;

Figure 5 is a cross section on the line 5—5 of Figure 3;

Figure 6 is a detail longitudinal section on the line 6—6 of Figure 5;

Figure 7 is a detail section on the line 7—7 of Figure 5;

Figure 8 is a longitudinal vertical section of my variable speed power transmission showing a hand wheel mechanism for varying the speed of the power output;

Figure 9 is a cross section on the line 9—9 of Figure 8;

Figure 10 is a cross section on the line 10—10 of Figure 8;

Figure 13 is a cross section on the line 13—13 of Figure 8;

Figure 14 is a detail longitudinal section on the line 14—14 of Figure 10;

Figure 15 is a detail longitudinal section on the line 15—15 of Figure 8;

Figure 16 is a detail plan view of the speed indicating mechanism;

Figure 17 is a detail plan section, of part of the speed indicating mechanism, on the line 17—17 of Figure 8;

Fig. 18 is a detail plan section of the speed indicating mechanism on the line 18—18 of Figure 8;

Figure 19 is a plan view of one of the gripper levers;

Figure 20 is a detail perspective view partly in section of the speed shifter sleeve;

Figure 21 is a detail cross section the power output showing the relation of one of the grippers or clutchers;

Figure 22 is a section on the line 22—22 of Figure 21;

Figure 23 shows a modified form of gripper or clutch;

Figure 24 is a sectional view on the line 24—24 of Figure 23;

Figure 25 is a cross section of a modification of the power output clutch control and speed shifting mechanism showing a single control lever, the location of the line of section being the same as that of Figure 5;

Figure 26 is a side view of the universal clutch control and speed shifting lever of Figure 25;

Figure 27 is a vertical section on line 27—27 of Figure 25;

Figure 28 is a longitudinal section on the line 28—28 of Figure 25;

Figure 29 is a detail perspective of the forked rocker arm showing the spiral keyways for giving rotary motion through lateral movement;

Figure 30 is a detail plan section taken on the line 30—30 of Figure 25;

Figure 31 is a view of the preferred type of clutcher or gripper;

Figure 32 is a section on the line 32—32 of Figure 31;

Figure 33 shows a vertical section of a modified form of reciprocating motion transmitting mechanism;

Figure 12:
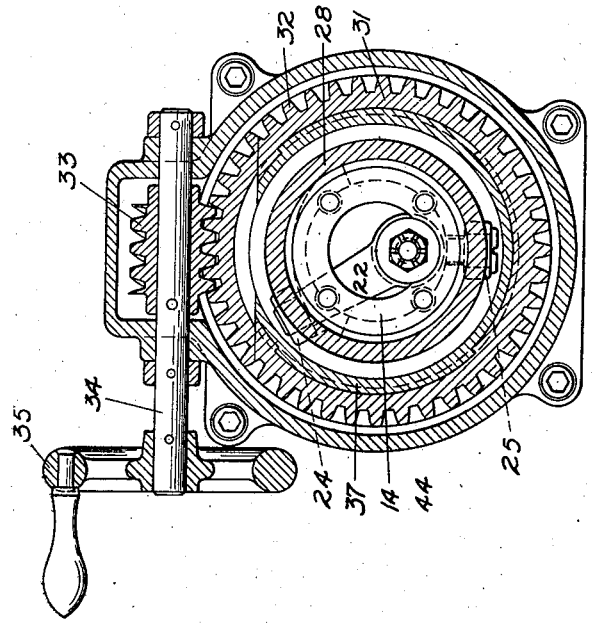
Figure 12 is a cross section on the line 12—12 of Figure 8.
Figure 11:
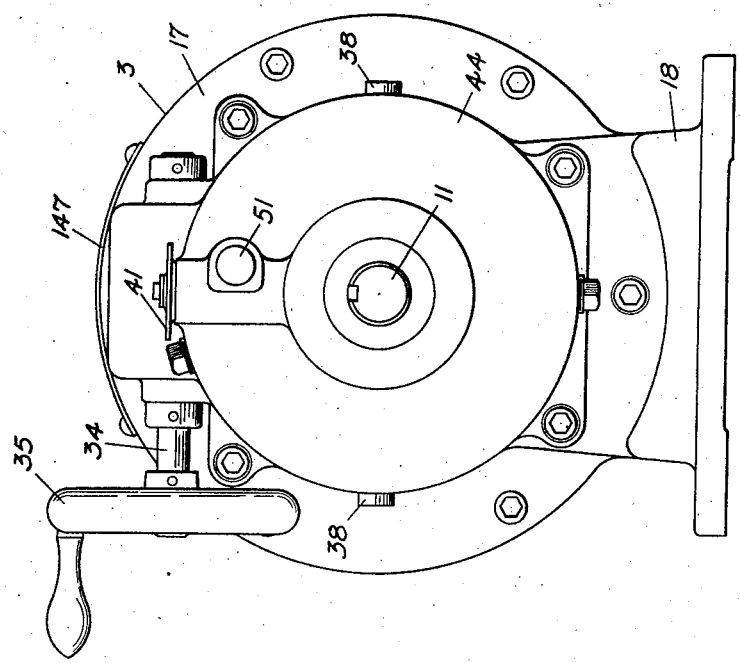
Figure 11 is an elevation of the power input end of Figure 8.

Referring first to Figure 1, the numeral 2 represents a base upon which my variable speed transmission case 3 is mounted. The power input shaft of the transmission is provided with a coupling 4 which connects with a motor 5, or other power source. On the power output side of the variable speed transmission is a clutch 6, having a clutch control rod 7, controlled by a lever 8. The driven member of the clutch is keyed or otherwise secured to the driven shaft 9, which is mounted in a suitable bearing 10.

The clutch 6, see Figure 4, is disengaged by moving the rod 7 to the right and is engaged by moving the rod to the left. Figure 4 shows the clutch in engaged position. I claim no invention in the detail construction of the clutch, but I am showing it because in practice clutch means is desirable, and in some instances necessary.

Referring to Figure 8, 11 is a shaft at the power input end of the transmission, which shaft may be directly connected to an electric motor, or to any other source preferably a source of constant speed power. The outer end of the shaft 11 is mounted in a suitable ball bearing 12, and the inner end is provided with a flange 13, and for the purpose of assembling is bolted to a member 14 by suitable cap screw 15. The member 14 is mounted in a ball bearing 16, the inner member of the ball bearing being rigidly secured to a member 14, and the outer member of the ball bearing 16 being mounted in a member 17 which constitutes a part of the transmission case 3, which case has a base 18. Bearings 12 and 16 thus rotatably support member 14 and shaft 11 which move in unison.

The rotative member 14 is provided with a bore 19 which is eccentric to the rotative axis of shaft 11 and this bore is adapted to receive the stub shaft 20 of a driving member 21. The shaft 20 is eccentric to the center of the driving member 21 (see Figure 13), so that by rotatably adjusting this shaft the center of the driving member 21 can be swung to a position concentric with the shaft 11, so that no motion is given to member 21, by rotation of member 14, thereby causing the power output to be at zero. Therefore, beginning at the concentric or zero position, the output speed can be increased by increasing the eccentricity of these centers.

On the opposite end of shaft 20, is an arm 22 secured against rotation and rigidly fixed to the shaft 20 by any suitable means such as a square shank with lock washer and nut 23. On the outer end of the arm 22, is a roller 24. The member 14 is cut away (see Figure 12) sufficiently to permit a substantial oscillation of the arm 22. At the opposite side of the rotative axis of shaft 20 is a roller 25, mounted on a stud 26, which stud is secured to the member 14.

The driving member 21 is provided with a counterweight 27 (see Figure 13). The location of this counterweight is such that when the center of the driving member 21 is in a concentric relation with the rotative axes of the power input and power output shafts, it is then more out of balance, but since this is the zero position of oscillation, there can be no out-of-balance motion or need for balancing action. As the driving member 21 is moved into greater and greater eccentric relation, the balancing function is performed in greater and greater degree, and it is proportional to the degree of eccentricity, so that, as the speed increases the balanced condition is more perfect. When the higher speeds are attained, the mechanism is in complete balance. At the very top speed the counter-weight may be so arranged that it will then cause the driving member 21 to be slightly out of balance, the point being that there is provided a fixed counterweight adapted to balance the driving member 21 so as to reduce vibration to the minimum throughout the range of speeds for which the device is designed. I consider this feature very important, in that it eliminates the need of automatically shifting counter-weights, which are difficult to arrange in small space, and which are expensive and liable to get out of order. From the drawings, see Figures 8, 12 and 13, it is clear that the arm 22 on the shaft 20 controls the position of the driving member 21 as to its concentricity or eccentricity relatively to the rotative axes of the shafts 11 and 140, the latter being the power output.

In order to control the arm 22 while the mechanism is in motion, a sleeve 28 is provided. The sleeve is mounted at one end on a ball bearing 29, the inner part of the bearing being rigidly secured by the usual means to a sleeve 30, and the inner end of the sleeve 30 is in threaded engagement with a member 31 to securely lock the inner part of the bearing 29. The member 31 has on its outer surface spiral or worm teeth 32 engaged by a worm wheel 33, mounted on a shaft 34, and controlled by the hand wheel 35 (see Figure 12). The inner surface of the member 31 is provided with a thread 36 in operative relation with complemental threads of member 37. The member 37 is rigidly secured to the casting 17 by suitable cap screws 38 (see Figure 15). The sleeve 28 is provided with a pair of spiral slots 39 and 40 (see Figure 20). These spiral slots are shown as cut in the same direction. The roller 25 of member 14 is in operative relation to spiral slot 39, and the roller 24 operates in the spiral slot 40.

From the above description it is clear that as the system, including the bearing 29 is moved to the right by operation of the hand wheel 35, shaft 34, worm 33 and worm wheel 32, it will, because of the thread connection 36 with the member 37, cause the sleeve 28 to move to the right. The spiral slot 40 operating on the roller 24 therefore moves arm 22 and shaft 20 to correspondingly adjust the relation of the axis of element 21 to the axis of shaft 11. Member 28 is kept from revolving by roller 25 of member 14 operating in the spiral slot 39. Thus, members 14 and 28 rotate in unison, but member 28 is axially translatable on member 14. To increase the throw of the arm 22 (through the roller 24 operating in the spiral slot 40) the slot 39 is also made spiral to multiply the speed in the same direction, otherwise this slot could be straight, and in some instances may be.

There has just been described means for varying the speed of my variable speed power transmission, while in motion or standing still, through the operation of the hand wheel 35, and associated elements. This is accomplished by a sufficiently large gear reduction, so that the thrust load against the hand wheel 35 will be negligible and therefore so that it can be turned by normal effort. It is evident that by using this form of speed adjustment, an interval of time will lapse in changing the speed from zero to maximum, depending upon the number of turns of the hand wheel 35 necessary to move the bearing 29 and the corresponding parts from one extreme position to the other.

In order to indicate the point at which the variable speed power transmission is adjusted, see Figures 8, 16, 17, 18, there is provided a dial 41, the face of which is suitably divided, and has marks corresponding to speeds from zero to ten. This dial 41 is part of a plug 42 which is screwed into a tapped hole 43 in the casing member 44, which casing is bolted to the base member 17. The plug 42 rotatably journals a stud 45 which has a pointer 46 secured to one end, and has at the opposite end a gear 47 that meshes with a gear rack 48 on a plunger 49. The plunger 49 has one end contacting the member 31 and is held in contact by a spiral spring 50 located below the gear 47, said spiral spring 50 having one end fixed to the gear and the opposite end to the casing 44. A suitable hollow guard 51 is screwed in a recess 52 to protect the end of the plunger 49 (see Figures 8, 16, 17 and 18).

From the above description it is clear that because the plunger 49 is made to contact with the member 31 at all times, it will move with that member and will operate the dial stem to indicate definitely the position of the member 31. The action is through rack 48 on the member 49, said rack 48 serving to rotate the gear 47 on the shaft 45 which shaft has the pointer or speed indicator 46. The arrangement is such that when the member 31 is at the extreme left position or top speed position, the pointer will indicate ten, as shown in Figure 16, and when the member 31 is at its extreme right position, the pointer then will indicate zero on the dial.

In Figures 1, 2, 3 and 5, a modified speed changing device has been shown in which a suitable clutch 6 (see Figure 4) is first disengaged by the lever 8 so as to disconnect the driven member. This lever 8 (see Figures 5 and 7) is provided with a cam 53 secured to the lever 8 by a suitable jaw clutch arrangement 54. The cam 53 therefore moves with the lever 8. Bearing against the cam 53 is a plunger 55, one end of which bears against the cam 53 and adapted to drop into the recess 56 of the cam after the clutch 6 has been disengaged. The plunger 55 is held against rotation by a suitable pin 57, and its upper end bears against one arm of a lever 58 pivoted at 59, the opposite arm of which lever is provided with a head having a series of serrations 60 (see Figure 6) which are adapted to fit in corresponding serrations 61 of the sleeve 31. The co-acting threads 36 (see Figure 8) are in this instance eliminated, and a member 62 corresponding to the member 37, serves as a guide on the outside of the member 31. Suitable studs 63 and 64 are riveted on opposite sides to the member 31 and operate in slots in the member 62 to prevent relative rotation of the member 31. The studs 63 and 64 have projections adapted to fit in the forked ends of the arms 65 and 66. The arms 65 and 66 are secured by suitable pins 67 and 68 to the rock shaft 69. An arm 70, provided with a handle 71, is pinned to the rock shaft 69 by a pin 72.

From the above description it will be clear that in order to change the speed of the variable speed transmission, the operator first moves the lever 8 from the full line position of Figure 2, to the dotted line position. This movement will first disengage the clutch 6, then the plunger 55 will drop into the depression 56, the spring 73 causing the lever 58 to follow the plunger and move the member 60 away from the member 61 to thereby unlock the sleeve or member 31, so that it can now be shifted by lever 70.

Since the load on the driven member is removed because of disengagement of clutch 6, very little power is required to change the speed instantly by moving the lever 70 either forwardly or backwardly, by and through arms 65 and 66, and studs 63 and 64 moving member 31. As soon as the operator has selected the correct position, he moves the lever 8 back from the dotted line position in Figure 2 to the position shown in full lines. This operation first locks the member 31 against translative movement and then engages the clutch.

In Figures 25, 26, 27 and 28, I have shown another modified form of speed change control device in which the actions of disengaging the clutch, and shifting the sleeve 31 (after same is unlocked) is accomplished by a single lever. In this instance, the same arms 65 and 66 (as in Figure 5) are used to shift the sleeve 31, except that in Figure 25 the arms 65 and 66 are mounted on a hollow shaft 74, mounted in bearings 75 and 76, the sleeve being secured against rotation by the set screw 77 having a projection 78 which passes into a small hole in the hollow shaft 74. On the outer left-hand of the hollow shaft 74, is an extension 78a to serve as a bearing for a rocking member 79 which is held in position by a cap 80, see Figure 27, and suitable cap screws 81, and to which the clutch rod 7 is secured at 82. At 83 is provided a cam surface 84, having a depression 85. Plunger 55 bears against the cam and enters the depression under the proper conditions.

At 86, on the member 79 is provided a pivot 87, and a sector 88. On the sector are suitable graduations (see Figure 30) from zero to ten, and on the arm 89, is an indicator 90, the arm 89 being provided with a knob 91. The lower end of the arm 89 is provided with a fork 92 having round projections 93 engaging the groove 94 of a flanged member 95 secured to a plunger 96 by means of a nut 97. The plunger 96 is adapted to be translated in the hollow shaft 74 and is provided with an enlargement 98 having angular projections 99 (see Figure 28) extending through slots 100 in hollow shaft 74. These slots are parallel with the axis of the shaft 96 and the angular members 99 extend into grooves 101 and 102 in the hub of the arms 65 and 66 (see also Figure 29). By this arrangement the hub is caused to rotate on the shaft 74 upon lateral movement of the plunger 96. Since the hollow shaft 74 is kept from turning by means of the cap screw 77, it is obvious that lateral movement of the plunger 96 will oscillate the sleeve 103 through the action of the angular shaped members 99 and their engagement through the slots 100 with the grooves 101 and 102. This form of speed changing may be preferable where the two operations are required to be performed with a single lever. Suitable packing provisions are provided at 104 to prevent oil from seeping out around the plunger 96. I have now described various means by which the driving member 21 can be moved from a concentric to an eccentric position, for transmitting power, from zero to the maximum speed in my power transmission device.

Referring to Figures 8, 9, 10, 13 and 14, I will now describe my improved mechanism for transposing, or translating oscillatory motion into continuous rotary motion. A ball bearing 105, see Figure 8, has its inner part securely mounted to the driving member 21; the outer part of the ball bearing is attached to a spider 106, see Figure 13. This spider 106 is provided with studs 107 and 108, see Figure 10, and rollers 109 and 110. The rollers 109 and 110 are adapted to slide in grooves 111 and 112 of a member 113. The member 113 is kept from revolving by in turn having similar grooves 114 and 115 in which rollers 116 and 117 slide, said rollers being mounted on studs 118 and 119, and said studs being secured in the member 17 by suitable set screws 120 and 121. From the above description it is clear that the spider 106 is prevented from revolving with the driving member but is permitted to have an oscillating motion in two directions, which are in this instance at right angles to one another.

Referring to Figures 9, 10 and 13. On the spider 106, I preferably provide six radially arranged studs 122 secured by welding or riveting or in any other practical manner. On these studs I pivotally mount arms 123, said arms being free to swing, and being held on the studs by a suitable washer and castle nut arrangement 124 (see Figure 8). At the opposite end of the arm 123, (see Figures 21 and 22) is provided a fork 125, having secured thereto a shoe 126, the securing means being a pin 127. Said pin is pressed into the shoe 126 and held rigid in any suitable manner, the projections of the pin 127 being the bearings for the arms of the fork 125. The shoe 126 has gripper means 128 which is constituted by oppositely extending lateral projections 129 and 130. These projections 129 and 130 are constructed so that by pulling on the arm 123, the two high points indicated by arrows will be caused to rock, to lock against the surface of members 131, 132 and 133.

To prevent locking by a pushing action on the arms 123, extensions 134 and 135 are provided, see Figure 21, on the projections 129 and 130, which extensions serve as suitable guides and also prevent locking in one direction. In order to insure immediate gripping when the direction of motion of the arm 123 is reversed, a small hole 136 is provided in the projection 130, and in it is mounted a small reciprocable friction plug 137 and a spring 138 pressing the plug outwardly against a face of element 133. The purpose of this friction arrangement of the plug 137 held against the side wall of the member 133 by the spring 138, is to insure immediate gripping of the two points indicated by the arrows in Figure 21. These points being on opposite sides of the center line, they have, when the element 126 is rocked in the proper direction, a positive wedging grip in that direction. In this embodiment the action is obtained by pulling on the arm 123. An immediate releasing and sliding action is obtained when the direction is reversed as when pushing on the arm 123.

In Figures 23 and 24, is shown a slight modification of the rocker clutch scheme shown in Figures 21 and 22. In this case the gripper points or edges instead of operating in a groove, operate on opposite sides of flanges of members 131 and 133. The bearing point of the friction member 137, is against the surface of bottom member 132. In practice, I prefer to have friction member 137 bear against the bottom of the member 132, instead of against the inner sides of elements 131 or 133 as shown in Figures 21 and 22. For compactness I prefer the construction in Figures 21 and 22, and therefore I claim and reserve the right to use a construction in which the element 137 engages the element 132 in Figures 21 and 22, or in which element 137 engages the element 131 or 132, in Figures 23 and 24.

The member 132 and the members 131 and 133 are all bolted together by suitable bolts 139 (see Figure 8). The member 132 is further keyed to the driven or power output shaft 140 by means of the key 141. Suitable bearings 142 and 143 are provided for the shaft 141, which bearings are secured as in the usual accepted engineering practice. The bearings 142 and 143 are further mounted in casting 144, which is bolted to the base or body member 17 by suitable bolts 145. A suitable drain plug 146 is provided, as well as a peep-hole cover plate 147.

For operation, power is applied to the power input end of the transmission through shaft 11, and with the driving member 21 set in the extreme eccentric position shown in Figure 8, the maximum degree of oscillation of the spider 106, will occur. Since the spider 106 only oscillates, the effect is to give an individual crank motion to each of the studs 122, this motion being represented at the upper part of Figure 9 by a dot-and-dash line circle. Since the arms 123 are mounted on the studs 122, they transmit a reciprocating or ratcheting movement to the grippers 126. As hereinbefore described, these grippers lock in one direction and slide freely in the opposite direction, and since there are a plurality (in this instance six) of the grippers operating continuously, continuous rotary motion is transmitted to the driven or output shaft 140.

When the speed changing mechanism is operated to bring the driving member 21 into concentric relation with the axes of the power input shaft 11 and the power output shaft 140, there is no oscillating motion of the spider 106 and therefore no crank motion to the studs 122, and therefore no rotary motion is transmitted to the shaft 140. It is obvious that the variations in speed depend upon the positions of the axis of the driving member 21 with reference to the axis of the power input shaft 11 and the power output shaft 140.

Figure 35:
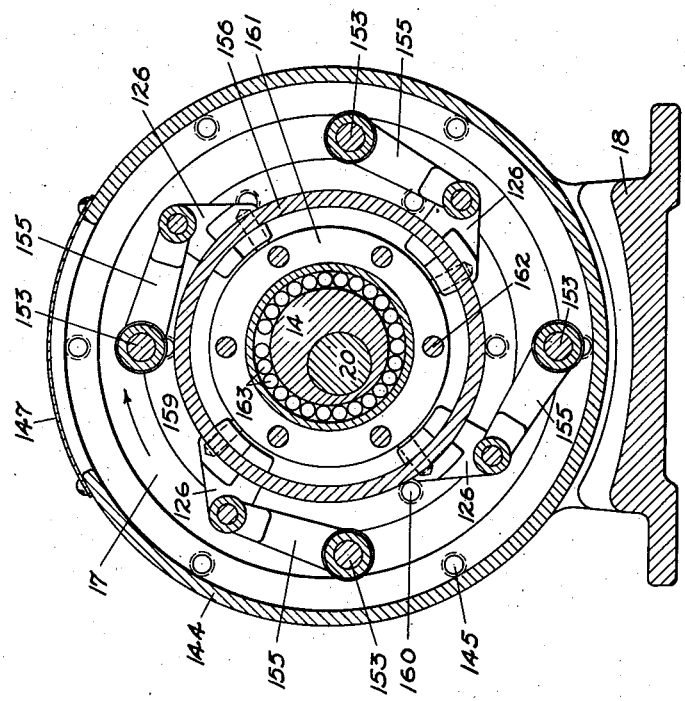
Figure 35 is a cross section on the line 35—35 of Figure 33.
Figure 34:
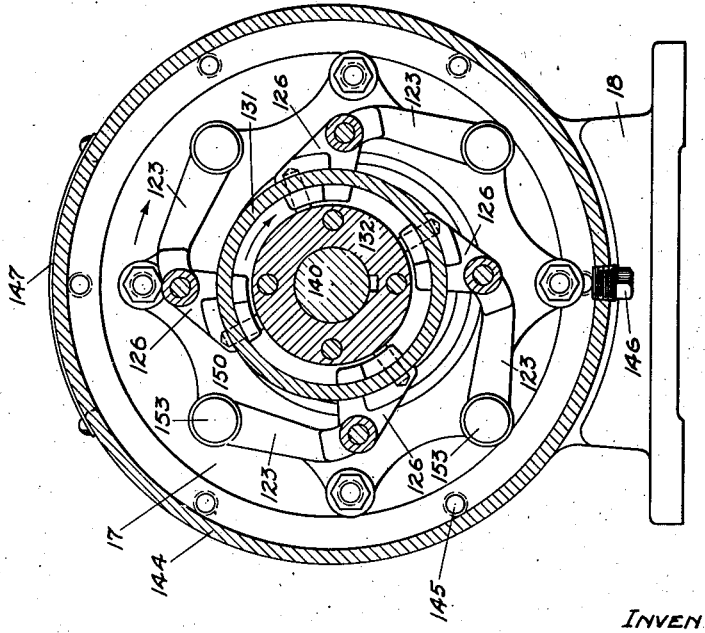
Figure 34 is a cross section on the line 34—34 of Figure 33.

In Figure 33, there is shown a modification, in which a yoke 150 (corresponding to the yoke 106, shown in Figure 8) is made up of two parts 151 and 152, held together by shouldered bolts 153 secured by castle nuts 154. These shouldered bolts serve as a bearing for the gripper levers 155, and 123, see also Figures 34 and 35. The purpose of making the member 150 in two parts is to simplify the installation of the ball bearing. The gripper levers 155 correspond in shape and operation to the gripper levers 123, shown in Figure 8, but these levers are connected to grippers that operate on stationary flanges 156 and 157 of stationary members 158 and 159. The member 159 is bolted securely to the base or body member 17 by bolts 160, and the members 158 and 159 are separated from each other by spacer member 161. The member 158 and the member 161 are bolted to the member 159 by bolts 162. A suitable needle bearing 163 is provided in the member 161 for member 14. The advantage of the construction shown in Figures 33, 34 and 35 is that the spider 150 is revolved through the action of the gripper arms 155 and the clutches 126 in the same direction as the power output member 140, and therefore the speed is doubled for the same adjusted throw of the driving member 21.

In Figure 33, I have shown the driving member 21 provided with a threaded flanged plug 164 for solidly clamping the inside race of the ball bearing 105, the same being kept from unscrewing by the screw 165.

I claim as my invention:

1. A variable speed power transmission device having, power input means and power output means, a driving member operated by the power input means, and having a lever arm extending transversely to its rotative axis and shiftable to concentric or eccentric positions relatively to the axis of rotation of said power input means to vary the output speed, an oscillable yoke operated by said driving member, motion transmitting means connecting said yoke with said power output means, and means for shifting the arm of said driving member to shift said member from concentric to eccentric position.

2. A variable speed power transmission device having, power input means and power output means, a driving member operated by the power input means and shiftable to concentric or eccentric positions relatively to the axis of rotation of said power input means to vary the output speed, motion transmitting means connecting said driving member with said power output means, and means for shifting said driving member from concentric to eccentric position, including a sleeve shiftable axially of the driving member and rotatable therewith and having spiral slots respectively operably engaged with one end of a lever carried by the driving member, said lever arranged transversely of the rotative axis of said driving member.

3. A variable speed power transmission device, having power input means and power output means, a driving member operated by the power input means and shiftable to concentric or eccentric positions relatively to the axis of rotation of said power input means to vary the output speed, reciprocable motion transmitting means connecting said driving member with said power output means, and means for shifting said driving member from concentric to eccentric position, said shifting means including a worm gear meshing with a worm wheel, which is movable lengthwise of the axis of rotation of the power input means.

4. A variable speed power transmission device, having power input means and power output means, a driving member, operated by the power input means and shiftable to concentric or eccentric positions relatively to the axis of rotation of said power input means to vary the output speed, reciprocable motion transmitting means connecting said driving member with said power output means, means for shifting said driving member from concentric to eccentric position, said means including a shaft eccentrically mounted on said driving member, and means for rocking said shaft, including a sleeve shiftable axially of the driving member and rotatable therewith, and having diametrically disposed spiral slots operative to shift the shaft.

5. A variable speed power transmission device, having power input means and power output means, a driving member, operated by the power input means and shiftable to concentric or eccentric positions relatively to the axis of rotation of said power input means to vary the output speed, reciprocable motion transmitting means connecting said driving member with said power output means, means for shifting said driving member from concentric to eccentric position, said means including a shaft eccentrically mounted on said driving member, a lever arm transverse to the axis of and for controlling the position of said shaft, a translatable sleeve having spiral slots operatively controlling the position of said arm, and means for moving said sleeve.

6. A variable speed power transmission device, having power input means and power output means, a driving member, operated by the power input means and shiftable to concentric or eccentric positions relatively to the axis of rotation of said power input means to vary the output speed, motion transmitting means connecting said driving member with said power output means, means for shifting said driving member from the concentric to eccentric position, including a rock shaft eccentrically mounted on said driving member, and having a lever arm transverse to its axis, a translatable sleeve having spiral slots, means for adjustably moving said sleeve, and means for locking said sleeve in adjusted position.

7. A variable speed power transmission device, having power input means and power output means, a driving member, operated by the power input means and shiftable to concentric or eccentric positions relatively to the axis of rotation of said power input means to vary the output speed, motion transmitting means connecting said driving member with said power output means, and means for shifting said driving member from concentric to eccentric position, including a lever arm on the driving member transverse to its rotative axis, and an axially translatable sleeve having spiral slots, each operatively engaging one arm of said lever.

8. A variable speed power transmission device, having a power output clutch, and having power input means and power output means, a driving member, operated by the power input means and shiftable to concentric or eccentric positions relatively to the axis of rotation of said power input means to vary the output speed, motion transmitting means connecting said driving member with said power output means, and means for shifting said driving member from concentric to eccentric position, including a power output clutch control means and means operated thereby to first disengage the power output clutch and then shift said driving member.

9. A variable speed power transmission device, having power input means and power output means, a driving member, operated by the power input means and shiftable to concentric or eccentric positions relatively to the axis of rotation of said power input means to vary the output speed, motion transmitting means connecting said driving member with said power output means, means for shifting said driving member from the concentric to eccentric position, said means including a rock shaft disposed eccentrically on said driving member, an arm for controlling said rock shaft, a translatable sleeve provided with two spiral slots, one of said slots being engaged with one end of said arm for controlling the rock shaft, and the other slot being engaged with a projection of the power input means, and means for translating said sleeve.

10. A variable speed power transmission device, having power input means and power output means, a driving member, operated by the power input means and shiftable to concentric or eccentric positions relatively to the axis of rotation of said power input means to vary the output speed, motion transmitting means connecting said driving member to said power output means, means for shifting said driving member from concentric to eccentric position, a clutch for said power output means, a lever for controlling said clutch, means controlled by the lever for unlocking the shifting means, and a lever and means by which it moves said shifting means.

11. A variable speed power transmission device, having power input means and power output means, a driving member, operated by the power input means and shiftable to concentric or eccentric positions relatively to the axis of rotation of said power input means to vary the output speed, motion transmitting means connecting said driving member with said power output means, means for shifting said driving member, including a cylinder secured to a stationary part of said transmission device, threads on the outside of said cylinder, a sleeve having threads on the inside and coacting with the outside threads of said cylinder, gear teeth on the outside of said sleeve, and a worm meshing with said gear teeth, and means by which said sleeve controls the position of said driving member.

12. A variable speed power transmission device having driving and driven members, means by which the driving member drives the driven member including a part normally concentric with the driving member but being shiftable to an eccentric position to vary the speed of the driven member, means movable with and axially of the driven member for shifting said normally concentric means, a clutch for the driven member, means for preventing axial shifting of said part, means for controlling the clutch, and means operated by the clutch control means after the clutch is shifted to de-clutched position for operating the shift-preventing means to allow shifting.

13. A variable speed power transmission device having a driving member, a driven member and crank concentric and movable with the driving member but capable of movement to an eccentric position with respect thereto, means operatively connecting said crank with said driven member, and means for moving the crank to an eccentric position, including a sleeve surrounding the driven member rotatable therewith, and axially translatable thereon, a second sleeve operating the first and means for axially translating the second sleeve, a clutch for the driven member and means by which operation of the last mentioned means first disengages the clutch and then shifts the sleeve.

14. A variable speed power transmission device, having power input means and power output means, a driving member operated by the power input means and shiftable to concentric or eccentric positions relatively to the axis of rotation of said power input means to vary the output speed, reciprocable motion transmitting means connecting said driving member with said power output means, and means for shifting said driving member from concentric to eccentric position, said shifting means including an inner sleeve shiftable axially of the power input means, a second sleeve operably connected by a ball bearing to the first sleeve and also shiftable axially, said driving member having a lever arranged transversely of its axis and said inner sleeve having spiral grooves operatively related to the arms of said lever.

15. A variable speed power transmission device, having power input means and power output means, a driving member operated by the power input means and shiftable to concentric or eccentric positions relatively to the axis of rotation of said power input means to vary the output speed, motion transmitting means connecting said driving member with the power output means, means for shifting said driving member, including a shaft eccentrically mounted on said driving member, an arm for said shaft and a sleeve movable with said driving member, and shiftable axially thereof and having diametrically disposed spiral slots cooperating with said arm to shift it for the purpose set forth.

16. A variable speed power transmission device, having power input means and power output means, a driving member operated by the power input means and shiftable to concentric or eccentric positions relatively to the axis of rotation of said power input means to vary the output speed, reciprocable motion transmitting means connecting said driving member with said power output means, and means for shifting said driving member from concentric to eccentric position, said shifting means including an inner sleeve shiftable axially of the power input means, a second sleeve operably connected by a ball bearing to the first sleeve and also shiftable axially, means for locking the outer sleeve against shifting, and means operable first to release the locking means and then to shift said outer sleeve.

EDWIN G. STAUDE.